(12) United States Patent
Stewart et al.

(10) Patent No.: US 8,698,068 B2
(45) Date of Patent: Apr. 15, 2014

(54) EXTENDING OBJECT CONTACT DURING MOTION OVER AN OPTICAL SENSOR

(75) Inventors: Aaron Michael Stewart, Raleigh, NC (US); Hiroki Hirano, Fujisawa (JP); Thomas John Sluchak, Apex, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 360 days.

(21) Appl. No.: 13/154,118

(22) Filed: Jun. 6, 2011

(65) Prior Publication Data

US 2012/0306753 A1 Dec. 6, 2012

(51) Int. Cl.
 *G06M 7/00* (2006.01)
 *G06F 3/033* (2013.01)
 *G06F 3/02* (2006.01)

(52) U.S. Cl.
 USPC ............................ 250/221; 345/160; 345/168

(58) Field of Classification Search
 USPC ........... 250/221; 345/157, 160, 166, 168–172
 See application file for complete search history.

(56) References Cited

U.S. PATENT DOCUMENTS

| | | | | |
|---|---|---|---|---|
| 6,323,845 B1 * | 11/2001 | Robbins | ......................... | 345/168 |
| 7,002,549 B2 * | 2/2006 | McCahon et al. | ............ | 345/156 |
| 2003/0206154 A1 | 11/2003 | Hill et al. | | |
| 2007/0040108 A1 * | 2/2007 | Wenstrand | ..................... | 250/221 |
| 2009/0295733 A1 * | 12/2009 | Stenbroten | ..................... | 345/168 |
| 2010/0025572 A1 * | 2/2010 | Arnold | ......................... | 250/231.1 |

* cited by examiner

*Primary Examiner* — Thanh Luu
(74) *Attorney, Agent, or Firm* — Kunzler Law Group

(57) ABSTRACT

A landing surface is in physical communication with a face of an optical sensor. The landing surface extends at least 0.5 millimeters (mm) beyond a side of the optical sensor. A sensor orifice provides optical sensing by the optical sensor through the landing surface.

19 Claims, 7 Drawing Sheets

EXTENDING OBJECT CONTACT DURING MOTION OVER AN OPTICAL SENSOR

FIELD

The subject matter disclosed herein relates to motion extension and more particularly relates to a motion extension over a sensor.

BACKGROUND

Description of the Related Art

A sensor may be used to detect a motion input in order to move a cursor on display. Some sensors, such as an optical sensor, have a small surface area. As a result, multiple motions across a surface of the sensor may be required to make a long motion of the cursor across the display.

BRIEF SUMMARY

Based on the foregoing discussion, the inventors have recognized a need for an apparatus, system, and method for motion extension over a sensor. Beneficially, such an apparatus, system, and method would increase motion of a finger across a sensor.

The embodiments of the present invention have been developed in response to the present state of the art, and in particular, in response to the problems and needs in the art that have not yet been fully solved by currently available sensor bezels. Accordingly, the embodiments have been developed to provide a method, apparatus, and system for motion extension over a sensor that overcome many or all of the above-discussed shortcomings in the art.

The apparatus for motion extension over a sensor is provided with a plurality of elements. A landing surface is in physical communication with a face of an optical sensor. The landing surface extends at least 0.5 millimeters (mm) beyond a side of the optical sensor. A sensor orifice provides optical sensing by the optical sensor through the landing surface.

A system is also presented for motion extension over a sensor. The system may be embodied an input device. In particular, the system, in one embodiment, includes a keyboard, an optical sensor, a landing surface, and a sensor orifice.

The keyboard comprises keys. The optical sensor is disposed among the keys. A landing surface is in physical communication with a face of the optical sensor. The landing surface extends at least 0.5 mm beyond a side of the optical sensor. A sensor orifice provides optical sensing by the optical sensor through the landing surface.

A method is also presented for motion extension over a sensor. The method in the disclosed embodiments substantially includes the steps necessary to carry out the functions presented above with respect to the operation of the described apparatus and system.

A landing surface is provided in physical communication with a face of an optical sensor. The landing surface extends at least 0.5 mm beyond a side of the optical sensor. A sensor orifice is provided that provides optical sensing by the optical sensor through the landing surface.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations of apparatuses, systems, methods and program products according to various embodiments. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures. Although various arrow types and line types may be employed in the flowchart and/or block diagrams, they are understood not to limit the scope of the corresponding embodiments. Indeed, some arrows or other connectors may be used to indicate only the logical flow of the depicted embodiment.

Figure 1:
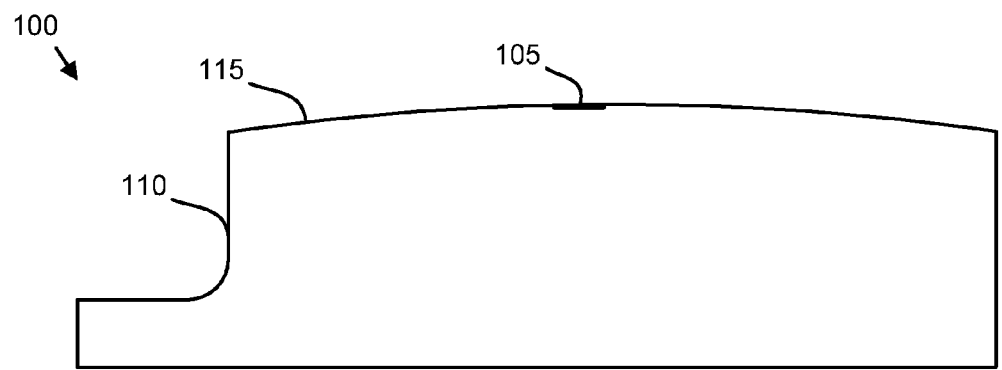
FIG. 1 is a side view drawing illustrating one embodiment of an optical sensor.

FIG. 1 is a side view drawing illustrating one embodiment of an optical sensor 100. The sensor 100 may include a sensor port 105, a side 110, and a face 115. The sensor 100 may detect motion relative to the sensor port 105. For example, the sensor 100 may detect motion of a finger across the sensor port 105.

The motion detected by the sensor 100 may be used to move a cursor on a display, scroll a display, navigate through menu options, and the like. Unfortunately, multiple motions over the sensor port 105 may be required to generate a significant cumulative motion. The embodiments described herein extend motion over the sensor 100 as will be described hereafter.

In one embodiment, the optical sensor 100 is a selected from a Model M33C02, a Model M34C00R2, or the like optical sensor produced by Partron of Hwaseong, Korea.

Figure 2:
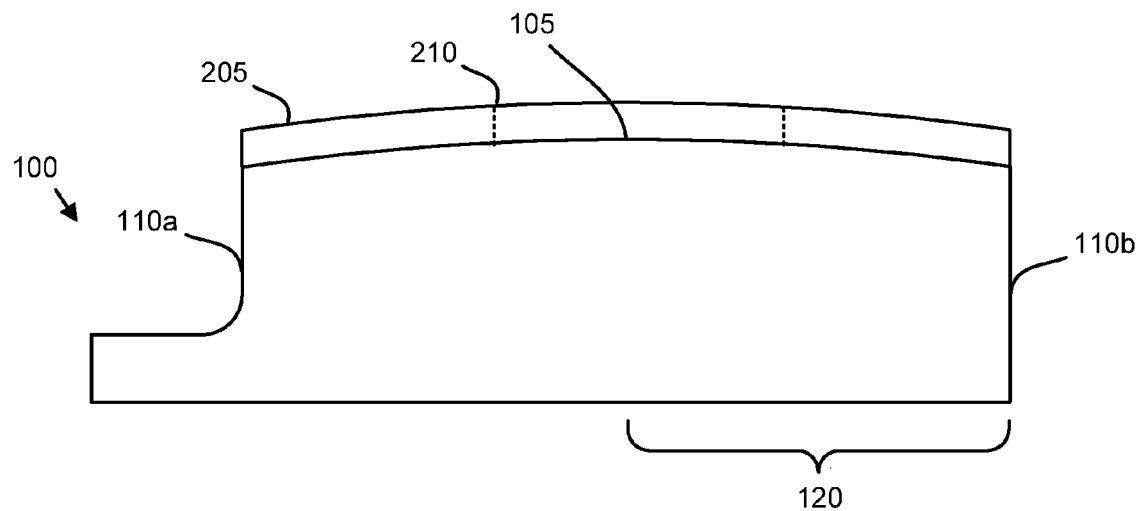
FIG. 2 is a side view drawing illustrating one embodiment of an optical sensor and a landing surface.

FIG. 2 is a side view drawing illustrating one embodiment of an optical sensor 100 and a landing surface 205. The optical sensor 100 may be the optical sensor 100 of FIG. 1. The description of the optical sensor 100 and the landing surface 205 refers to elements of FIG. 1, like numbers referring to like elements.

The landing surface 205 is in physical communication with the face 115. The landing surface 205 includes a sensor orifice 210. In one embodiment, the sensor orifice 210 provides for optical sensing by the optical sensor 100 through the landing surface 205. The sensor orifice 210 may be a hole in a landing surface 205. Alternatively, the sensor orifice 210 may include a transparent material that passes light to and from the sensor port 105.

The landing surface 205 may be textured to resist motion over the landing surface 205. By resisting motion, the texture may effectively extend the feel of a motion across the landing surface 205. The landing surface 205 may be textured with a texture selected from the group consisting of smooth, glossy, beaded, randomized, divoted, ridged, and grooved.

In one embodiment, the landing surface 205 has a dynamic coefficient of friction in the range of 0.3 to 0.7. Alternatively, the landing surface 205 may have a dynamic coefficient of friction in the range of 0.45 to 0.55. In a certain embodiment, the dynamic coefficient of friction is selected to reduce the motion of a finger across the landing surface 205 in the range of 0.4 to 0.8 times for a specified force of the finger. For example, if the finger would normally move 10 mm for the specified force, the coefficient of friction of the landing surface 205 may be selected so that the finger moves 0.5×10 mm or 5 mm for the specified force. In addition, the sensor 100 may be selected for greater sensitivity to motion. In one embodiment, a higher sensitivity optical sensor 100 may be employed.

The landing surface 205 may be bonded to the face 115. Alternatively, the landing surface 205 may conform to a contour of the face 115. The face 115 may include one or more polarizing elements, locks, and the like to restrain the landing surface 205 relative to the face 115.

In one embodiment, the landing surface 205 is held in place relative to the face 115 by posts extending from the face 115 into holes disposed within the landing surface 205. In an alternate embodiment, the landing surface 205 is held in place by posts extending from the landing surface 205 into holes disposed within the sensor 100. In a certain embodiment, the landing surface 205 is secured to the face 115 by one or more fasteners such as screws, clips, and the like.

The sensor 100 may include a sensor radius 120. The sensor radius 120 may be a distance from the sensor port 105 to a side 110 of the sensor 100.

Figure 3:
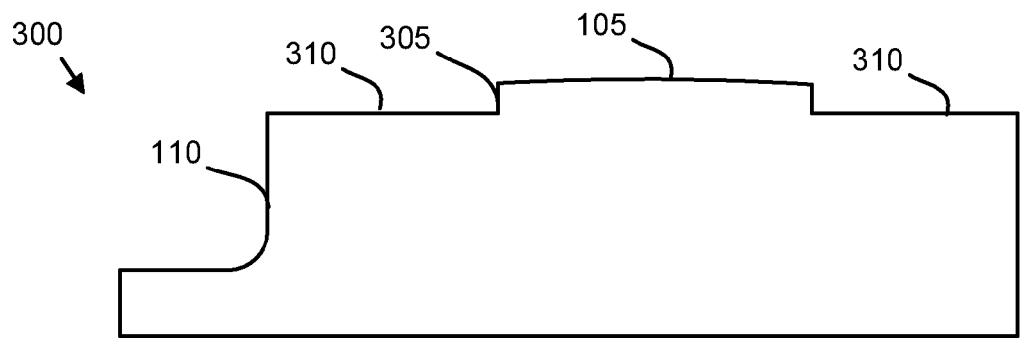
FIG. 3 is a side view drawing illustrating one embodiment of an optical sensor with removed material.

FIG. 3 is a side view drawing illustrating one embodiment of an optical sensor 300 with removed material. The optical sensor 300 may be the optical sensor 100 of FIG. 1 with material removed to form a sensor mating surface 310 and a sensor column 305. The description of the optical sensor 300 refers to elements of FIGS. 1-2, like numbers referring to like elements.

In one embodiment, the optical sensor 300 is machined to form the sensor mating surface 300 and the sensor column 305. The sensor port 105 may be within the sensor column 305. In an alternate embodiment, the optical sensor 105 is produced with the sensor mating surface 300 and the sensor column 305

Figure 4:
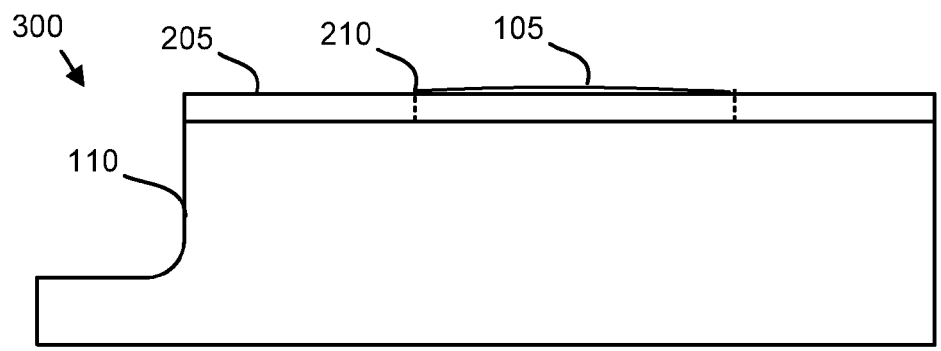
FIG. 4 is a side view drawing illustrating one embodiment of an optical sensor and a landing surface.

FIG. 4 is a side view drawing illustrating one embodiment of an optical sensor 300 and a landing surface 205. The optical sensor 300 may be the optical sensor 300 of FIG. 3. The landing surface 205 may be the landing surface 205 of FIG. 2. The description of the optical sensor 300 in the landing surface 205 refers to elements of FIGS. 1-3, like numbers referring to like elements.

The landing surface 205 is a physical communication with the sensor mating surface 310. The sensor port 105 protrudes into the sensor orifice 210. In one embodiment, the sensor port 105 is coplanar with the landing surface 205. Alternatively, the sensor port 105 is recessed from the landing surface 205. In a certain embodiment, the sensor port protrudes from the landing surface 205.

In one embodiment, the sensor column 305 restrains the landing surface 205 from moving relative to the sensor mating surface 310. The sensor column 305 may include one or more polarizing elements, locks, and the like to restrain the landing surface 205 relative to the sensor mating surface 310.

Figure 5:
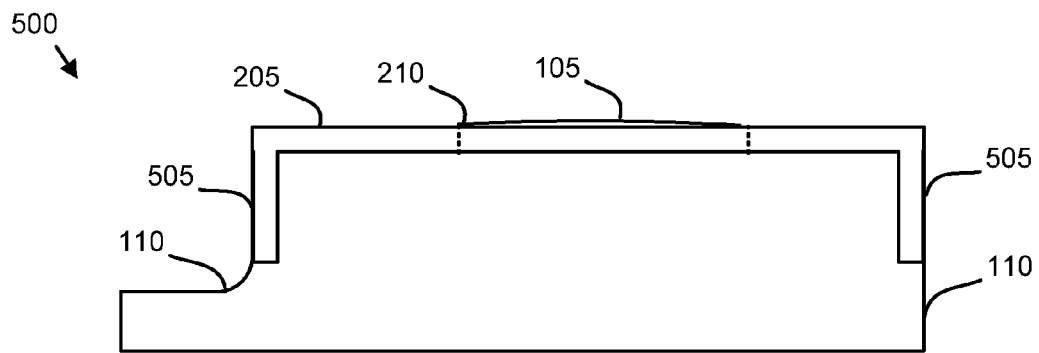
FIG. 5 is a side view drawing illustrating one embodiment of an optical sensor and a landing surface with sides.

FIG. 5 is a side view drawing illustrating one embodiment of an optical sensor 500 and a landing surface 205 with sides 505. The optical sensor 500 may be the optical sensor 300 of FIGS. 3-4. The description of the optical sensor 500 and landing surface 205 refers to elements of FIGS. 1-4, like numbers referring to like elements.

The landing surface 205 includes one or more sides 505. Each side 505 may be formed as a post, a curved wall, a straight wall, and the like. The sides 505 may be in physical communication with the optical sensor 500. The sides 505 may restrain motion of the landing surface 205 relative to the optical sensor 500.

In one embodiment, the sides 110 of the sensor 500 are machined to receive the sides 505 of the landing surface 205. Alternatively, the sides 110 of the sensor 500 may be formed to receive the sides 505 of the landing surface 205 in one or more grooves, indentations, and the like.

Figure 6:
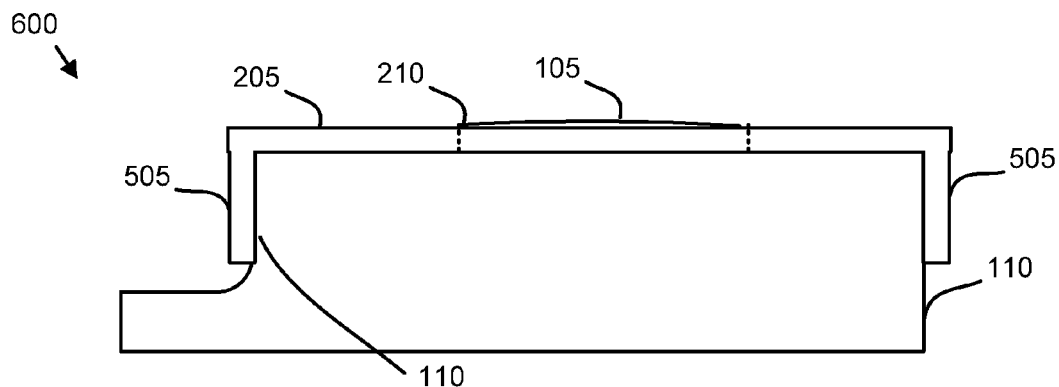
FIG. 6 is a side view drawing illustrating one alternate embodiment of an optical sensor and a landing surface with sides.

FIG. 6 is a side view drawing illustrating one alternate embodiment of an optical sensor 600 and a landing surface 205 with sides 505. The optical sensor 600 may be optical sensor 300 of FIGS. 3-4. The description of the optical sensor 600 and landing surface 205 refers to elements of FIGS. 1-5, like numbers referring to like elements.

The sides 505 of the landing surface 205 are shown in physical communication with one or more sides 110 of the optical sensor 600. The sides 110 of the optical sensor 600 may be unmodified. The sides 505 of the landing surface 205 may restrain motion of the landing surface 205 relative to the optical sensor 500.

Figure 7:
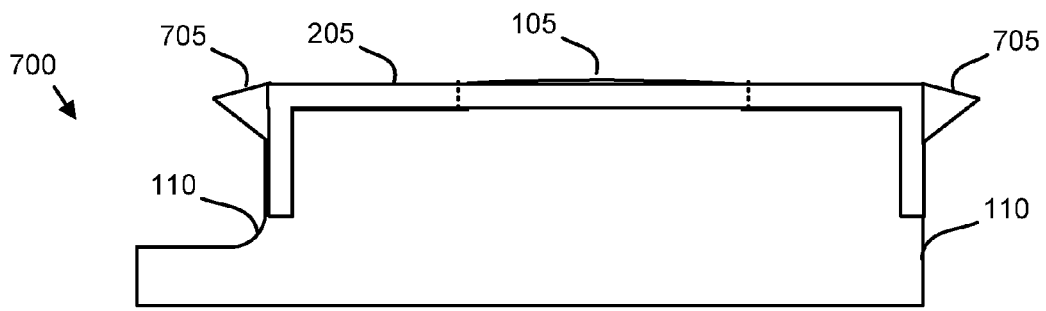
FIG. 7 is a side view drawing illustrating one alternate embodiment of an optical sensor and an extended landing surface.

FIG. 7 is a side view drawing illustrating one alternate embodiment of an optical sensor 700 and an extended landing surface 705. The optical sensor 700 may be the optical sensors 500 of FIGS. 5-6. The description of the optical sensor 700 refers to elements of FIGS. 1-6, like numbers referring to like elements.

The extended landing surface 705 may extend outward from the sensor port 105 beyond the sides 505 of the landing surface 205. Alternatively, the extended landing surface 705 may extend outward from the sensor port 105 beyond the sides 110 of the optical sensor 700. The extended landing surface 705 is depicted with a beveled edge. However the extended landing surface 705 may employ other edges as will be described hereafter.

In one embodiment, the extended landing surface 705 is an integral element of the landing surface 205. The extended landing surface 705 may extend that least 0.5 mm beyond a side 110 of the optical sensor 700. In one embodiment, the landing surface 205 with extended landing surface 705 has a combined area in the range of 1.1 to 8.0 times an area of the face 115. In a certain embodiment, the landing surface 205 with the extended landing surface 705 has a combined area in the range of 1.1 to 4.0 times an area of the face 115. Alternatively, the landing surface 205 with the extended landing surface 705 may have a combined area in the range of 1.5 to 4.0 times an area of the face 115.

The extended landing surface 705 may extend the distance that an object such as a finger is able to traverse the landing surface 205 in the range of 1.1 to three times the distance that the finger is able to traverse the landing surface 205 without the extended landing surface 705. By extending the landing surface 205, the extended landing surface 705 supports extended motion over the optical sensor 700.

For example, a user drawing a finger over the sensor port 105 may move 10 mm of the finger over the sensor port 105 without the landing surface 205 and extended landing surface 705. However, with the landing surface 205 and the extended landing surface 705, the user may draw the finger move 20 mm a finger over the sensor port 105, extending the motion over the optical sensor 100.

Figure 8A:
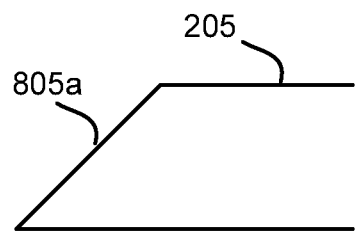
FIGS. 8A-D are side view drawings illustrating one embodiment of landing surface edges.
Figure 8B:
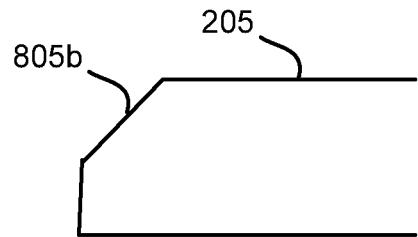
Figure 8C:
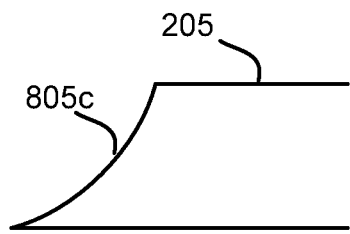
Figure 8D:
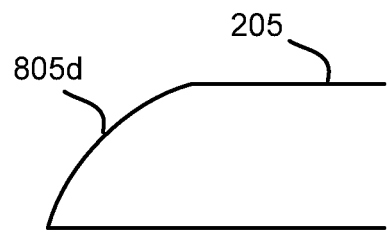

FIGS. 8A-D are side view drawings illustrating one embodiment of landing surface edges 805. The landing surface edges 805 may be edges of the landing surface 205 of FIGS. 2-6. Alternatively, the landing surface edges to 805 may be edges of the extended landing surface 705 of FIG. 7. FIG. 8A shows a beveled landing surface edge 805a. FIG. 8B shows a chamfered landing surface edge 805b. FIG. 8C shows a concave landing surface edge 805c. FIG. 8D shows a convex landing surface edge 805d.

In one embodiment, the landing surface edge 805 may include one or more beveled edges, chamfered edges, concave edges, and convex edges. In addition, the landing surface edge 805 may include one or more grooves, protrusions, and the like to guide a motion across the landing surface 205.

Figure 9:
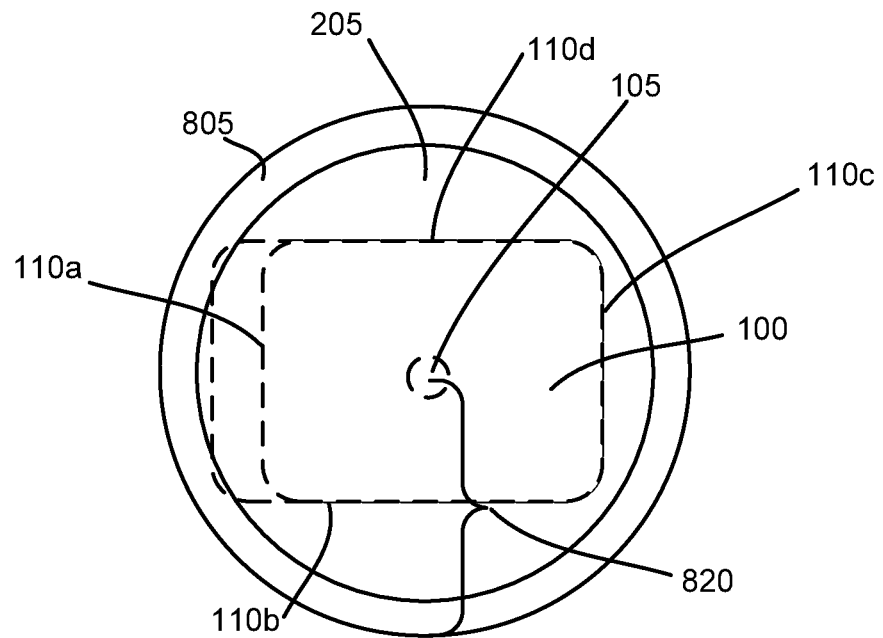
FIG. 9 is a hidden line top view drawing illustrating one embodiment of a landing surface.

FIG. 9 is a hidden line top view drawing illustrating one embodiment of a landing surface 205. The sensor 100 FIG. 1 is shown with a hidden line representation below the landing surface 205. The description of the landing surface 205 refers to elements of FIGS. 1-8, like numbers referring to like elements.

In the depicted embodiment, the extended landing surface 705 is integrated with the landing surface 205. The landing surface 205 extends beyond a least one side 110 of the optical sensor 100. The landing surface 205 further includes a landing surface edge 805.

In one embodiment, the landing surface 205 has a landing surface radius 820. The landing surface radius 820 may be a distance from the sensor port 105 to the landing surface edge 805.

FIGS. 10A-D are side view drawings illustrating one embodiment of surface shapes 1005 of the landing surface 205. The surface shapes 1005 may be the contours of the landing surface 205 of FIGS. 2-9. The description of the surface shapes 1005 refers to elements of FIGS. 1-9, like numbers referring to like elements.

Figure 10A:
FIGS. 10A-D are side view drawing illustrating one embodiment of surface shapes of the landing surface.
Figure 10B:
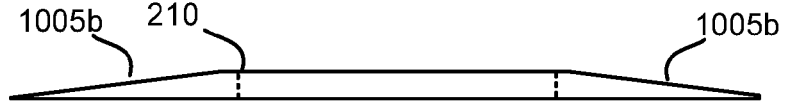
Figure 10C:
Figure 10D:

FIG. 10A shows a flat surface shape 1005a. FIG. 10B shows a beveled surface shape 1005b. FIG. 10C shows a concave surface shape 1005c. FIG. 10D shows a convex surface shape 1005d. In one embodiment, the surface shape 1005 is a combination of one or more flat surface shapes 1005a, one or more beveled surface shapes 1005b, one or more concave surface shapes 1005c, and one or more convex surface shapes 1005d.

Figure 11:
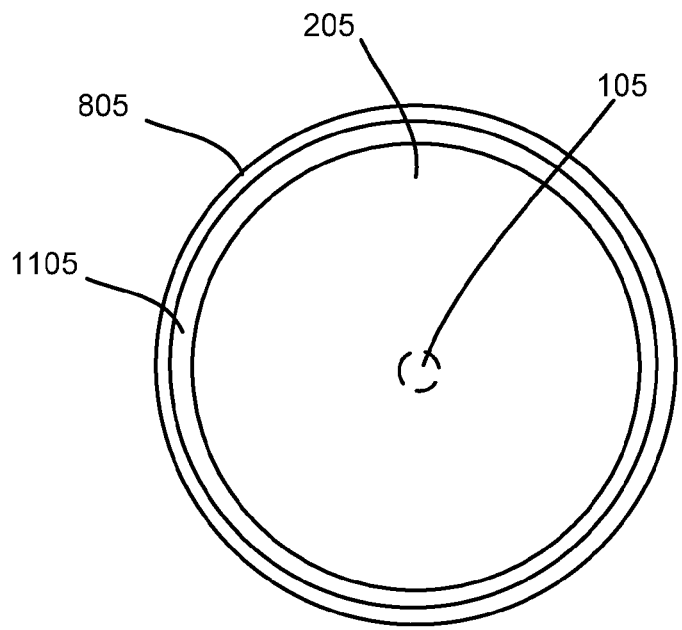
FIG. 11 is a top view drawing illustrating one embodiment of a landing surface with a ridge.

FIG. 11 is a top view drawing illustrating one embodiment of a landing surface 205 with a ridge 1105. The landing surface 205 may be the landing surface 205 FIGS. 2-10. The description of the landing surface 205 refers to elements of FIGS. 1-10, like numbers referring to like elements.

The ridge 1105 may have a circular profile, sinusoidal profile, a triangular profile, a square profile, and the like. In one embodiment, the ridge 1105 protrudes from the surface 1005 of the landing surface 205. In an alternate embodiment, the ridge 1105 is recessed in the surface 1005. In a certain embodiment, the ridge 1105 is a combination of a least one protrusion and a least one recession.

In one embodiment, the ridge 1105 may provide a tactile signal to a user that the user's finger is approaching the landing surface edge 805. The ridge 1105 may be positioned within 1 to 3 mm of the landing surface edge 805.

Figure 12:
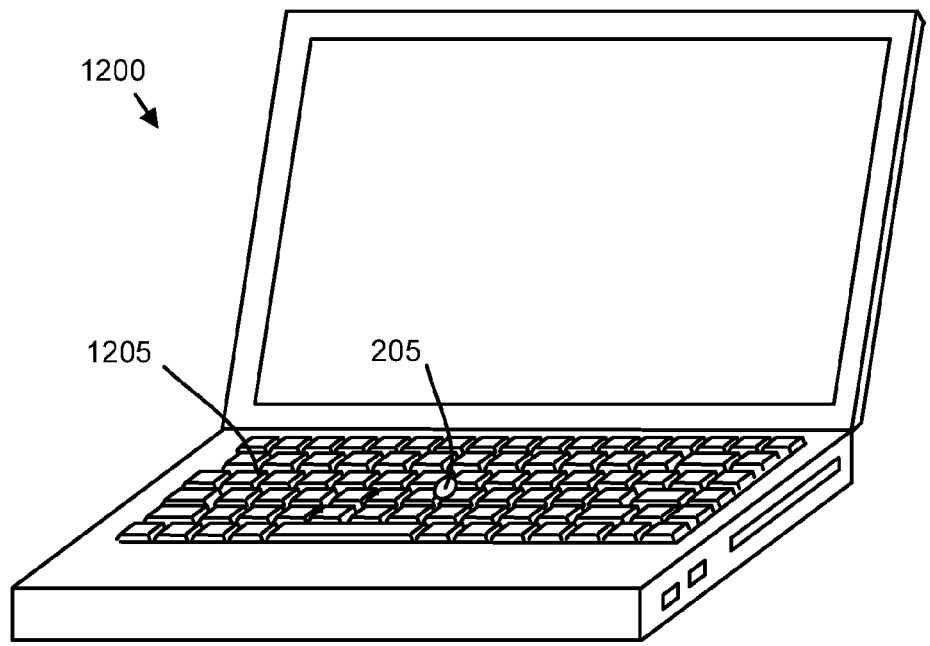
FIG. 12 is a perspective drawing illustrating one embodiment of a notebook computer.

FIG. 12 is a perspective drawing illustrating one embodiment of a notebook computer 1200. The landing surface 205 with optical sensor 100 beneath is shown disposed among the keys of a keyboard 1205. In landing surface 205, optical sensor 100, and keyboard may form an input device. The description of the notebook computer 1200 refers to elements of FIGS. 1-11, like numbers referring to like elements.

The optical sensor 100 may be disposed among the keys of the keyboard 1205. The landing surface 205 may be in physical communication with the sensor 100 to extend motion such as a motion of a finger over the sensor 100. In one embodiment, the landing surface 205 extends over a least one key of the keyboard 1205.

Figure 13:
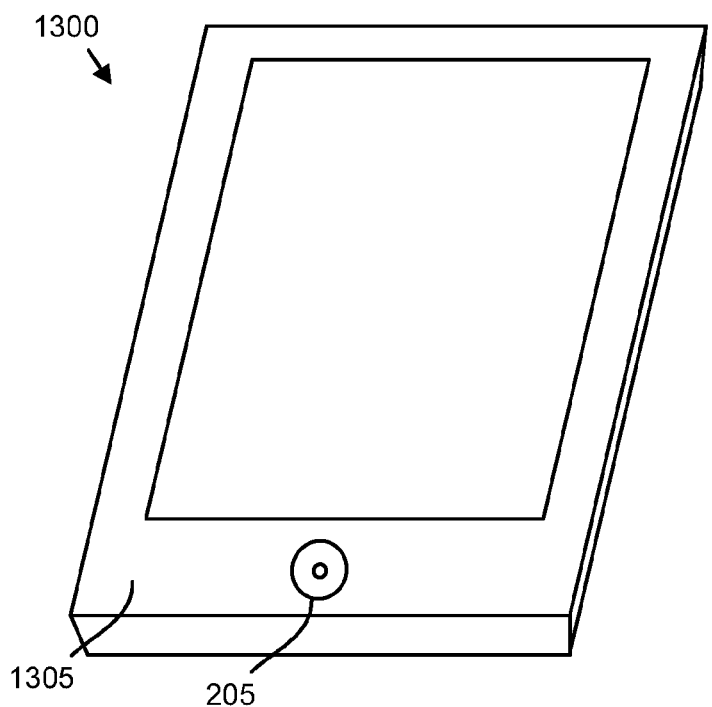
FIG. 13 is a perspective drawing illustrating one embodiment of an electronic device.

FIG. 13 is a perspective drawing illustrating one embodiment of an electronic device 1300. The landing surface 205 with the optical sensor 100 beneath is shown disposed on a device surface 1305. The description of the electronic device 1300 refers to elements of FIGS. 1-12, like numbers referring to like elements.

In one embodiment, the landing surface 205 may be flush with the device surface 1305. Alternatively, the landing surface 205 may protrude above the device surface 1305. In a certain embodiment, the landing surface 205 is recessed below the device surface 1305.

In one embodiment, the texture of the landing surface 205 may be distinct from the device surface 1305. For example, the texture of the device surface 1305 may be smooth while the texture of the landing surface 205 may be grooved. Alternatively, the texture of the landing surface 205 may match the texture of the device surface 1305.

Figure 14:
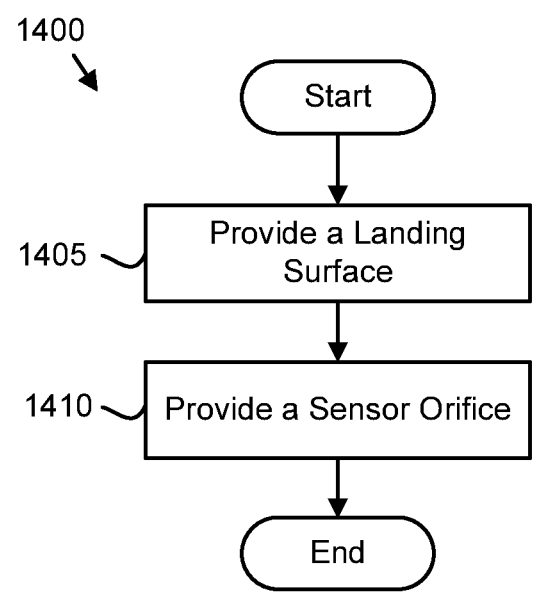
FIG. 14 is a schematic flow chart diagram illustrating one embodiment of a motion extension method.

FIG. 14 is a schematic flow chart diagram illustrating one embodiment of a motion extension method 1400. The method 1400 may perform the functions of the landing surface 205 and the sensor orifice 210 of FIGS. 1-13. The description of the method 1400 refers to elements of FIGS. 1-13, like numbers referring to like elements.

The method 1400 starts and in one embodiment provides 1405 a landing surface 205. The landing surface 205 is in physical communication with a face 115 of the optical sensor 100. In addition, the landing surface 205 may extend a least 0.5 millimeters beyond the side 110 of the optical sensor 100.

In one embodiment, the landing surface radius 820 and texture of the landing surface 205 combine to provide a target motion extension T. Equation 1 shows a relationship between the target motion extension T, a value for a landing surface coefficient of friction a, a coefficient of friction for the face 115 b, the sensor radius 120 q, and the landing surface radius 820 r.

$$T=(a/b)(q/r) \qquad \text{Equation 1}$$

For example, values for the landing surface coefficient of friction a and landing surface radius 820 r may be selected to yield a desired target motion extension T for the coefficient of friction for the face 115 b and the sensor radius 120 q.

The method 1400 further provides 1410 the sensor orifice 210 and the method 1400 ends. The sensor orifice 210 provides optical sensing by the optical sensor 100 through the landing surface 205.

Embodiments extend a motion across a sensor 100, including by slowing motion of an object such as a finger across the sensor, increasing the surface area around the sensor 100, and combinations thereof. Extending the motion across the sensor 100 and/or sensor port 105 reduces repeated motions across the sensor 100 to make an extended movement across a display. Thus a user may move a cursor a desired distance with one motion across the sensor instead of two.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a landing surface in physical communication with a face of an optical sensor and extending a radius r of at least 0.5 millimeters beyond a side of the optical sensor, wherein the landing surface is textured with a texture selected from the group consisting of beaded, randomized, divoted, ridged, and grooved, the landing surface texture having a specified coefficient of friction; and
a sensor orifice providing optical sensing by the optical sensor through the landing surface.

2. The apparatus of claim 1, wherein a sensor port of the optical sensor protrudes into the sensor orifice and is coplanar with the landing surface.

3. The apparatus of claim 2, wherein the sensor port and a sensor mating surface is formed by removing material from the optical sensor.

4. The apparatus of claim 1, wherein the landing surface comprises a surface shape selected from the group consisting of beveled, flat, concave, and convex.

5. The apparatus of claim 1, the landing surface further comprising an edge selected from the group consisting of a beveled edge, a chamfered edge, a convex edge, and a concave edge.

6. The apparatus of claim 1, the landing surface further comprising a ridge.

7. The apparatus of claim 1, wherein an area of the landing surface is in the range of 1.1 to 4.0 times greater than an area of the face the optical sensor.

8. The apparatus of claim 1, wherein the landing surface has a dynamic coefficient of friction in the range of 0.3 to 0.7.

9. The apparatus of claim 1, wherein the radius r is calculated as r=(a/b)(q/T), where a is the specified coefficient of friction of the landing surface texture, b is a coefficient of friction for the face of the optical sensor, q is an optical sensor radius, and T is a target motion extension.

10. A method for motion extension over a sensor comprising:
providing a landing surface in physical communication with a face of an optical sensor and extending a radius r of at least 0.5 millimeters beyond a side of the optical sensor, wherein the landing surface is textured with a texture selected from the group consisting of beaded, randomized, divoted, ridged, and grooved, the landing surface texture having a specified coefficient of friction; and;
providing a sensor orifice providing optical sensing by the optical sensor through the landing surface.

11. The method of claim 10, wherein a sensor port of the optical sensor protrudes into the sensor orifice and is coplanar with the landing surface.

12. The method of claim 11, wherein the sensor port and a sensor mating surface is formed by removing material from the optical sensor.

13. The method of claim 10, wherein the landing surface comprises a surface shape selected from the group consisting of beveled, flat, concave, and convex.

14. The method of claim 10, wherein the landing surface further comprises an edge selected from the group consisting of a beveled edge, a chamfered edge, a convex edge, and a concave edge.

15. The method of claim 10, wherein an area of the landing surface is in the range of 1.1 to 4.0 times greater than an area of the face the optical sensor.

16. The method of claim 10, wherein the landing surface has a dynamic coefficient of friction in the range of 0.3 to 0.7.

17. The method of claim 10, wherein the radius r is calculated as r=(a/b)(q/T), where a is the specified coefficient of friction of the landing surface texture, b is a coefficient of friction for the face of the optical sensor, q is an optical sensor radius, and T is a target motion extension.

18. A system comprising:
a keyboard comprising keys;
an optical sensor disposed among the keys;
a landing surface in physical communication with a face of the optical sensor and extending a radius r of at least 0.5 millimeters beyond a side of the optical sensor, wherein the landing surface is textured with a texture selected from the group consisting of beaded, randomized, divoted, ridged, and grooved, the landing surface texture having a specified coefficient of friction; and a sensor orifice providing optical sensing by the optical sensor through the landing surface.

19. The system of claim 18, wherein the radius r is calculated as $r=(a/b)(q/T)$, where a is the specified coefficient of friction of the landing surface texture, b is a coefficient of friction for the face of the optical sensor, q is an optical sensor radius, and T is a target motion extension.

* * * * *